US010996815B1

(12) United States Patent
Baseggio

(10) Patent No.: US 10,996,815 B1
(45) Date of Patent: May 4, 2021

(54) ELECTRONIC SYSTEM FOR AMENDING AND STUDYING CODES OF REGULATION

(71) Applicant: EASYSTUDY S.R.L., Fiumicino (IT)

(72) Inventor: Simona Baseggio, Fiumicino (IT)

(73) Assignee: EASYSTUDY S.R.L., Fiumicino (IT)

( * ) Notice: Subject to any disclaimer, the term of this patent is extended or adjusted under 35 U.S.C. 154(b) by 85 days.

(21) Appl. No.: 16/500,103

(22) PCT Filed: Apr. 9, 2018

(86) PCT No.: PCT/IB2018/052454
§ 371 (c)(1),
(2) Date: Oct. 2, 2019

(87) PCT Pub. No.: WO2018/189647
PCT Pub. Date: Oct. 18, 2018

(30) Foreign Application Priority Data

Apr. 12, 2017 (IT) .................. 102017000040685

(51) Int. Cl.
*G06F 3/048* (2013.01)
*G06F 3/0481* (2013.01)
*G06F 3/0482* (2013.01)

(52) U.S. Cl.
CPC ........ *G06F 3/04817* (2013.01); *G06F 3/0482* (2013.01)

(58) Field of Classification Search
CPC . G06F 3/03545; G06F 3/04817; G06F 3/0482
See application file for complete search history.

(56) References Cited

U.S. PATENT DOCUMENTS

| 2007/0171224 | A1 | 7/2007 | MacPherson |
| 2013/0262484 | A1* | 10/2013 | Kamat ................ G06Q 10/10 707/754 |
| 2014/0253522 | A1* | 9/2014 | Cueto ................. G06F 3/0383 345/179 |
| 2017/0090692 | A1* | 3/2017 | Kurita ............... G06F 3/04883 |

FOREIGN PATENT DOCUMENTS

TW          201205269          2/2012

OTHER PUBLICATIONS

International Search Report—PCT/IB2018/052454—dated May 22, 2018.

* cited by examiner

*Primary Examiner* — Claudia Dragoescu
(74) *Attorney, Agent, or Firm* — Nixon & Vanderhye

(57) ABSTRACT

Disclosed is an electronic system for amending and studying codes of regulation, including an Internet-connected electronic device receiving amendments of texts from a server. The electronic device includes a display with a timeline highlighting the text modification dates, labeling the successful reading or the failure thereof with symbols and/or colors. The electronic device includes an electronic pen allowing supplementing the text with highlights, remarks, notes, external links, images, etc. The electronic pen includes the following buttons: "mode", causing the reversible switching from a "highlighter" mode, to a "pen" mode, to an "eraser" mode; "timeline" to compare the different versions of the laws; "users" to view and share comments on the legislative texts with other users; "writing" to modify the writing settings and adapt the space available for the user for the remarks; and a tip to write with precision on the law texts and loaded documents.

20 Claims, 2 Drawing Sheets

ELECTRONIC SYSTEM FOR AMENDING AND STUDYING CODES OF REGULATION

FIELD OF THE ART

The present invention operates in the field of electronic devices and software. In particular the device of the present invention is adapted to facilitate the use of text books and codes of regulation in relation to their modifications over time.

Prior Art

Presently, eReaders or eBook readers are known as electronic reading instruments that are alternatives to books. The diffusion of these devices is predictable and desirable with regard to various aspects: firstly, for ecological-environmental reasons, since they reduce paper use and waste; secondly since kids and students who must study texts can avoid transporting heavy books; finally, the eBook allows lowering prices and therefore allows greater availability/diffusion of culture and information.

These are electronic devices suitably ideated for reading lengthy texts in digital format; normally in fact eBooks have particular displays with patented E-ink technology which does not damage the eyes of the reader, even for prolonged periods of observation. Among the advantages offered by this technology there is the possibility to supplement the text with multimedia contents such as dictionaries, personal notes, underlining and external links, indeed rendering the text a hypertext.

Some eBook models are also provided with an ePen, i.e. a dedicated digital pen, often housed in a suitable recess, with which remarks or notes can be easily made/taken alongside the text, just like in a paper book.

Various international patents protect eBooks and their multiple different forms. Among these, TW 201205269, for example, describes an energy savings system for eBooks which uses an optical pen. Said optical pen is provided with a proximity detection unit, which is used for detecting the distance between the optical pen and the display of the eBook.

Even if technology advances at high speed, a software and a device associated with said software that are dedicated to assisting the study of laws and codes of regulation—so often subjected to modifications by legislative bodies—do not appear to exist in the current state of the art. The modification of a small part of a rule, in fact, would involve the reprinting of an entire textbook or code of regulation, regarding which law students as well as professionals in the field study and keep themselves up-to-date.

The object of the present invention is therefore that of proposing a new and innovative system for amending textbooks and codes of regulation that aids the study of the evolution of laws over time.

DESCRIPTION OF THE INVENTION

According to the present invention, an electronic system is attained for amending and studying codes of regulation, effectively solving the abovementioned problems.

Advantageously said system is provided with an electronic device 100 constituted by a common electronic reader, of tablet or laptop type with touch screen. Said electronic device 100 has a common power on/power off button 106 and a battery power system with power supply port 107 for the connection of the battery-charger.

Advantageously, said electronic device 100 is provided with common Internet connection means 400, adapted to allow the reception of data relative to the regulatory texts and for the amending of said regulatory texts by a dedicated server 300 connected to a database 324, having in its memory the regulatory texts and all their amendments and versions modified over time.

Said electronic device 100 can also be advantageously provided with a common USB port 108 in order to allow the connection and the transceiving of data with a common data archiving unit or USB key. In addition, this can be configurable in order to share the view of the display with other electronic apparatuses due to common wireless connection means, such as Bluetooth, that can be reversibly enabled by the user.

Advantageously, said electronic device 100 has a touch-screen display 101 consisting of at least four portions: a central portion 101.*a* for viewing the preselected regulatory text; a top bar 101.*b* for viewing a timeline 150 better described hereinbelow; a bottom bar 101.*c* for viewing functions adapted to facilitate the user's studying experience, and an interactive index 101.*d*, preferably pop-up on the left side, adapted for viewing the list of rules and law articles present in the regulatory text under examination.

Said timeline 150 is advantageously adapted to highlight the dates when modifications to the selected regulatory text or parts thereof are stored. This really helps the student or professional who wishes to have an immediate and clear visual reference regarding the quantity of interventions and the historical period of modification of the law, and regarding which of these versions is being viewed by the user. Said timeline 150 is configured for labeling, with predetermined symbols and/or colors, the already-read amendments with or without highlights and/or remarks, and the amendments which have not yet been opened. In addition, advantageously in a very quick and intuitive manner, said timeline 150 makes it possible for the user to quickly go from the view of one version of the rule to that of another version which precedes or post-dates it; it is also advantageously possible to compare multiple regulatory texts of different historical periods, by simply selecting the modification dates of the regulatory text on said timeline 150, by means of a suitable dedicated function which can be enabled directly from the display or, even more advantageously and quicker, by the electronic pen 200 described hereinbelow. Said timeline 150, in particular, is characterized by a length equal to the period of existence of the rule, with reference to a time grid present in said top bar 101.*b*. The time period displayed in the screen can be modified widthwise and, by means of a horizontal swiping movement performed with the finger or by means of said electronic pen 200, it is always advantageously possible to slide the time grid forward or backward, in order to respectively view more recent or more remote periods.

In one version of the present invention, at the start of each article, a secondary timeline 150" is advantageously present on the law text, adapted to highlight the time periods in which the article has undergone a regulatory variation. Thus, the student or professional can clearly understand the effective period of each single article.

Said function icons on the bottom bar 101.*c* are advantageously constituted by a view icon 105 for viewing the law text, a comparison icon 109, an icon to reversibly enable viewing a full screen 110, an icon for starting the printing process 111, an icon for accessing a menu adapted for the management of the bookmarks 112, a "social media" icon 113 for displaying the users, who use the system, object of the present invention, who have commented or made remarks on the same law text, a "finger" icon 114 for the reversible enabling of the writing with the use of a finger by the user, a "folder" icon 115 adapted to create study folders with custom multimedia contents.

Like the common touch-screen displays, also the display 101 of the electronic device 100, constituting the present invention, is adapted to allow the reversible enlargement of the displayed text, with a widening or approaching movement of two fingers on said central portion 101.a of said display 101 or even on said timeline 150 present in the top bar 101.b; page change is also possible, forward or backward, through a horizontal swiping movement, to the left or to the right respectively, performed by the user with a finger on said central portion 101.a; the same movement, if performed on said top bar 101.b, causes the sliding of the timeline 150 forward or backward over time.

Advantageously, through a vertical swiping movement of the finger, upward or downward, in said central portion 101.a of said display 101, at one of the displayed columns, the vertical sliding of the text in that column takes place together with the simultaneous sliding of the law text in all the other displayed columns Due to this particular function, the user can advantageously reposition the text within the page at the preferred position, in order to assist one's photographic memory even if the single law articles had undergone textual variations with a consequent change of positioning within the page configuration.

In a preferred version of the present invention, in order to browse the text forward or backward by 7 pages (or another quantity of pages set by the user), the user must perform a horizontal swiping movement, respectively to the left or to the right, with two fingers touching the central portion 101.a of said display 101, while, in order to browse the text forward or backward by 50 pages (or another quantity of pages set by the user), the user must perform a horizontal swiping movement, to the left or to the right respectively, with three fingers.

Advantageously, in order to be able to comparatively study the different versions of the preselected regulatory text, in one version of the present invention, it is possible to select an option to simultaneous view the same article of the regulatory text in all variations thereof that were promulgated over the years, and display them side-by-side each other in chronological order.

In order to facilitate the insertion of said notes, remarks and highlights, which often characterize law study books, an electronic pen 200 is provided together with said electronic device 100; such electronic pen 200 is provided with a common internal rechargeable battery, operatively connected to said electronic device 100 by means of a common wireless connection, preferably of Bluetooth type.

Said electronic pen 200 is advantageously characterized by a tip 201 adapted to allow the user to write in a precise manner on said display 101.

Advantageously, by means of the tip 201 of said electronic pen 200, it is possible to write one's own comments or remarks in the blank space of the central portion 101.a of said display 101. By means of a suitable "writing" button 206 of said electronic pen 200, moreover, it is also possible to increase/decrease the space available in order to write or even modify the writing settings, such as the writing thickness or color.

Advantageously, on the bottom bar 101.c of said display 101, there is also a view icon 105 referred to the remarks, by means of which it is possible to reversibly enable or disable the view of that written by the user, with the consequent appearance/disappearance of the additional created space.

Said electronic pen 200 is also advantageously provided with a "mode" button 203 with three positions, adapted to cause the reversible switching from a "highlighter" mode, in which by passing said tip 201 over the text this will be provided with a colored background, to a "pen" mode in which the user can write remarks within the blank spaces of the displayed text, just like on a paper sheet, to an "eraser" mode for canceling what had been written. Said electronic pen 200 is also advantageously provided with a "timeline" button 204, adapted to be pressed by the user in order to select the versions of the law to be compared; by pressing said "timeline" button 204, indeed, the pen can touch said timeline 150, selecting the dates of interest. In this manner, the versions of the regulatory text relative to the selected dates will be displayed in chronological order in different columns, each on one part of the central portion 101.a of said display 101, to allow the user to make a comparative study of the variations of the rule over time. Said electronic pen 200 is also advantageously provided with a "social media" button 205 in order to know which users, who use the same system, object of the present patent, have commented on the various rules and display the comments thereof.

In this manner, the user can create actual "study folders" divided by subject matter and integrating various multimedia objects on the same argument. Such folders can also be created starting from a suitable "create folder" icon 115, placed on said bottom bar 101.c. During the setting of a study folder, in addition to the title of the folder, it is possible to link the collected material with one or more specific law articles and with an effective period of such regulations. In this manner, should the reference articles have to undergo variations, the system will be adapted to report, automatically, the obsolescence of the study folder and of the contents thereof.

In order to view and manage the various multimedia folders that have been created, it is advantageously possible to select a suitable option by pressing on a dedicated icon with the finger or with said electronic pen 200.

DESCRIPTION OF THE FIGURES

The invention will be described hereinbelow in at least one preferred embodiment as a non-limiting example, with the aid of the enclosed figures in which.

DETAILED DESCRIPTION OF THE INVENTION

The present invention will now be illustrated as a merely non-limiting, non-binding example, with reference to the figures which illustrate several embodiments relative to the present inventive concept.

Figure 1:
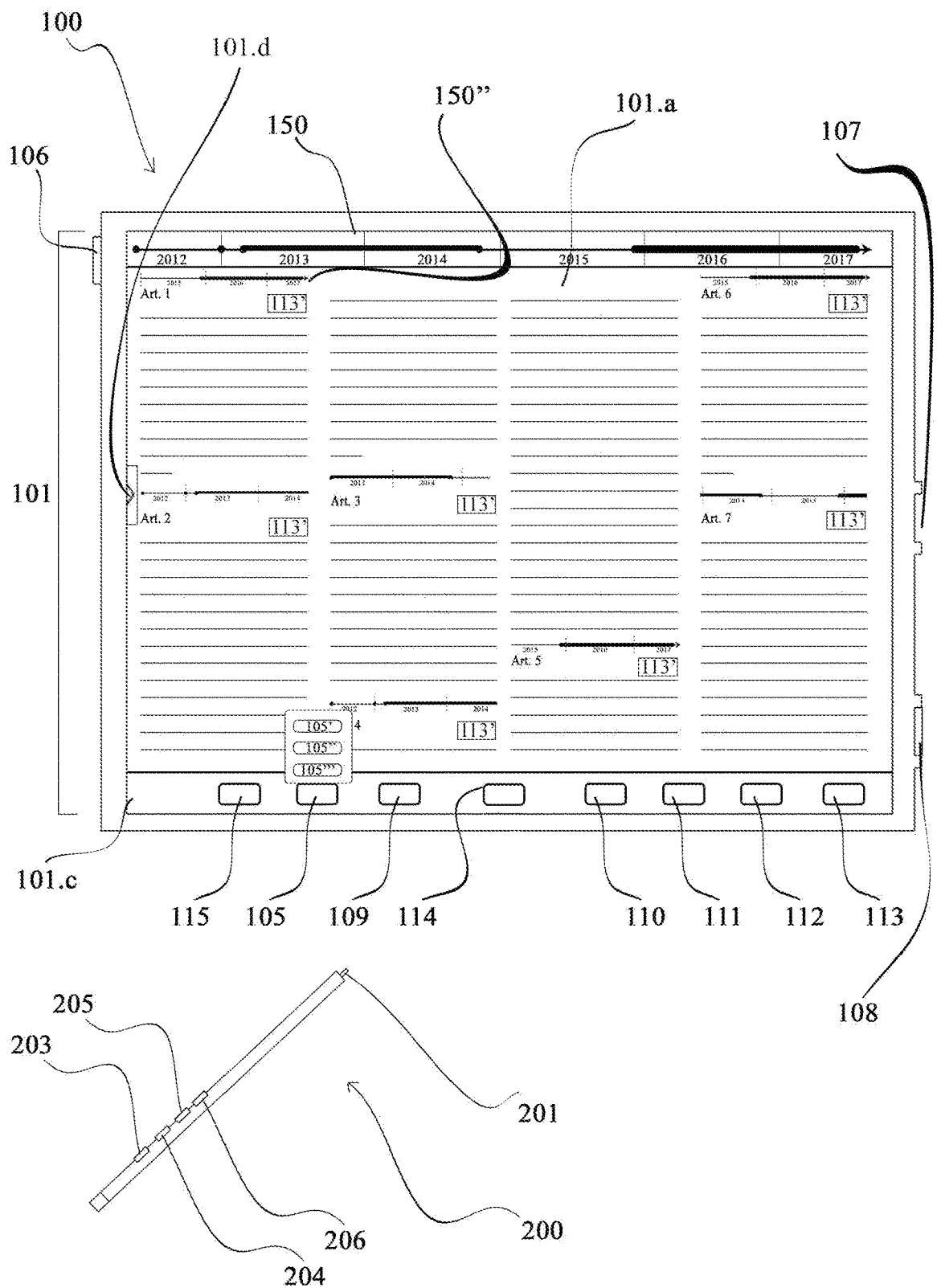
FIG. 1 shows an electronic device 100 according to the present invention provided with its electronic pen 200. One sees the display 101 divided into top bar 101.b, central portion 101.a, bottom bar 101.c., pop-up interactive index 101.d on a left lateral portion. On the bottom bar 101.c, one sees the view icon 105 of the law text, comparison icon 109, full screen icon 110, printing icon 111, an icon for the "management of the bookmarks" 112, a social media icon 113 for viewing the users connected to the same study system who have commented or remarked on the same law text, a "finger" icon 114 for enabling/disabling the writing with the finger, a "create study folder" icon 115 for creating the study folders with custom multimedia contents. On the central portion 101.a, one sees the text of the law divided into articles with parts underlined and other parts with remarks written with pen; other parts have comments written with the keyboard. The secondary timelines 150" for each article also appear displayed. On the top bar 101.b, one sees the timeline 150. On electronic device 100, in addition, one sees: the power on/power off button 106, the power supply port 107, the USB port 108 of the electronic pen 200. Regarding the latter, the following are exhaustively illustrated: the tip 201, the "mode" button 203, the "timeline" button 204, the "social media" button 205 and the "writing" button 206.

With reference to FIG. 1, the electronic device 100 is shown with the relative electronic pen 200 due to which the system, object of the present invention, can function. Said system is intended for students and professionals in the legal field. Indeed, in order to study a law, students and professionals often make remarks or notes in the margin of the text, and they read and keep up-to-date regarding the comments of authoritative jurists, thus creating confusing pages that are hard to comprehend. Due to the present system, students/professionals can make use of a software dedicated for creating study folders and legislative codes that are always updated and organized according to the criterion set by the user. In particular, each study folder can be connected to one or more law articles and possibly also to an effective period of the rule, allowing the system to signal the obsolescence of the folder when the articles linked to the folder undergo variations. In addition, it will also be possible to share law texts that have been commented on and assembled following the personal preferences of commentators from among the users of the system.

Figure 2:
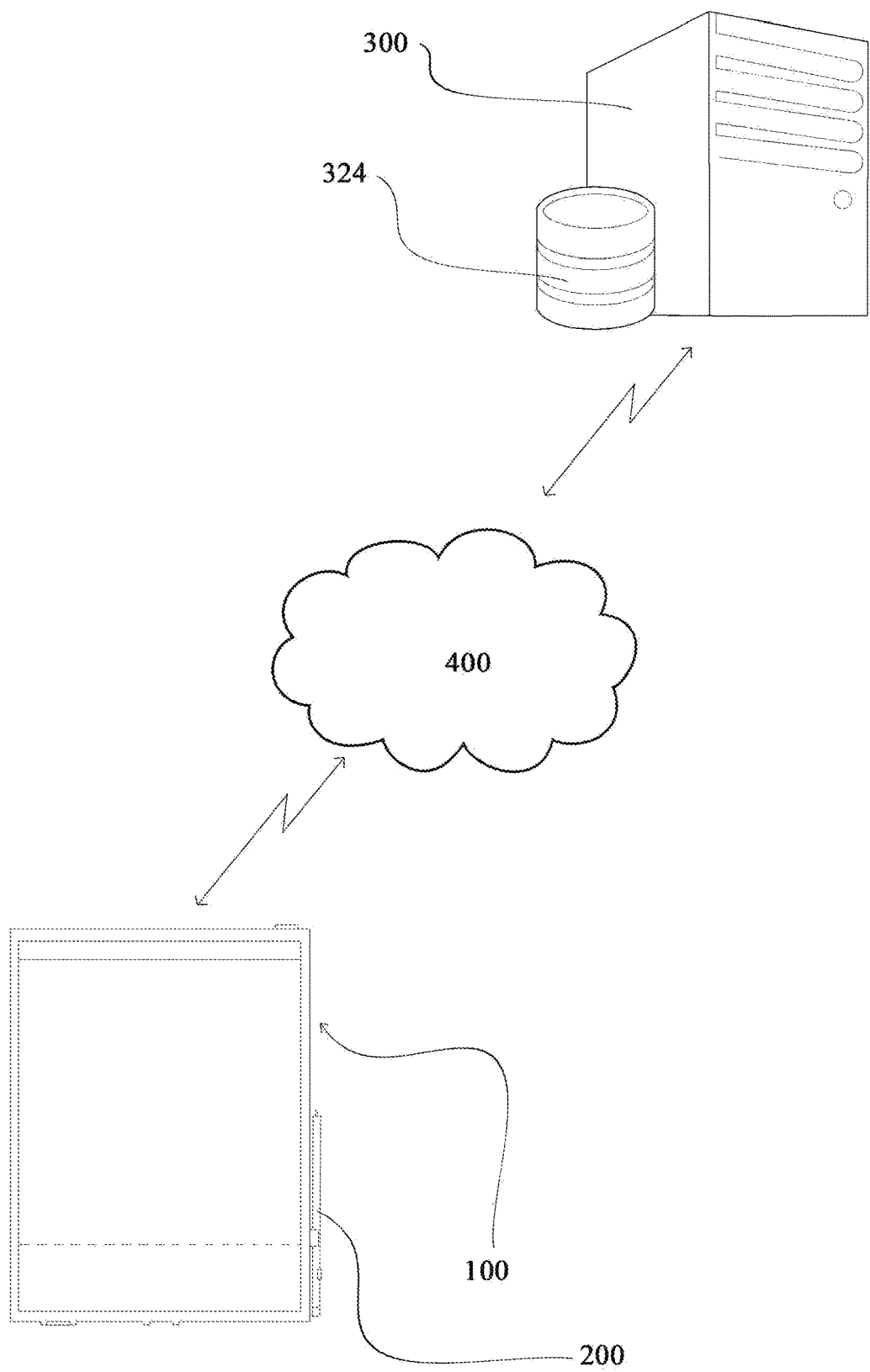
FIG. 2 shows the system of connection of said electronic device 100 to the server 300 in turn connected to a dedicated database 324. Said connection occurs by means of common Internet connection means 400.

The electronic device 100 used by said software is also provided with Internet connection 400, as shown in FIG. 2, which allows it to download data for amending the regulatory texts from a dedicated server 300, in turn connected to a memory database 324 of all the regulatory texts, even in past versions. Through said Internet connection 400, the system can return information regarding the obsolescence of the contents loaded in the system and the reference laws.

Another distinctive characteristic of the system of the present patent, in fact, consists of the possibility to consult the texts in the most-updated version as well as in the past versions, thus having a complete vision of the law to be studied and of the evolutions thereof.

The present electronic device 100, like many similar electronic devices currently exiting on the market, has: battery power supply provided with power supply port 107 and power on/power off button 106, USB port 108 and common wireless connection means, such as Bluetooth, that can be reversibly enabled by the user in order to share the display with other electronic apparatuses provided with the same connection system.

The display 101 is touch-screen and is divided into three main parts:

- a central portion 101.*a* in which the preselected regulatory text is displayed, which reproduces the typical layout of this kind of paper text, i.e. dual-column (or even dual-page, hence 4 columns total, in the case of horizontal view); alternatively, by pressing a comparison icon 109, it is possible to set a simultaneous view of the article or of the preselected law part in all variations thereof that have been promulgated over the years, and display them alongside each other in chronological order; preferably up to four versions can be displayed simultaneously, one for each textual column;
- a top bar 101.*b*, in which a timeline 150 is displayed which highlights the dates when modifications to the displayed law took place. In this timeline 150, as is visible in FIG. 1, the dates are labeled by symbols, in this case circles, which delimit predetermined intervals in order to signal to the user the successful reading of the text, with or without highlights and/or remarks and/or comments written by keyboard, or the failure to read the text. The dates of the displayed time version, moreover, are explicitly indicated in at the start-period and end-period symbols;
- an interactive index 101.*d*, preferably pop-up, on the left side, which displays the list of all the laws present in the regulatory text
- a bottom bar 101.*c* in which function icons are visible such as, by way of a non-limiting example:
  - a view icon 105 for viewing the law text, which in this case is provided with three switches 105', 105", 105''' which appear in a dedicated drop-down menu when one clicks said view icon 105. The first switch 105' is adapted to display or hide the remarks made with the electronic pen 200; the second switch 105" is adapted to display or hide the typed remarks; while the third switch 105''' is adapted to display or hide the secondary timelines 150" present at the start of each version of the analyzed article;
  - a comparison icon 109 by means of which it is possible to select the effective periods of the regulation that one wishes to compare, regarding the variations thereof over time and which appear in flanking columns positioned in chronological order, preferably by highlighting with suitable characters (e.g. different color) the differences between one effective period and another;
  - a full screen icon 110, in order to reversibly bring the view to full screen;
  - a print icon 111, in order to send the printing order to a common printer connected to said electronic device 100 by means of a common wireless system, preferably of Bluetooth type;
  - a "manage bookmarks" icon 112 for inserting, modifying, displaying or hiding the previously-set bookmarks, which are clickable in order to go quickly from one part of the text to the other. The bookmarks are displayed in the margin of the text and in positions or with a graphic that is differentiated in order to distinguish the bookmarks that belong to preceding pages from those belonging to subsequent pages with respect to the page of the regulatory text that is displayed;
  - a social media icon 113 for displaying the users connected to the same study system, who have commented or made remarks on the same law text: by means of said function, it is possible to ask the system if a given law text has been commented on by someone, and in accordance with the privacy settings of said users, go to read the comments thereof, creating a sharing of professionalism and opinions;
  - an "article social media" icon 113' visible on the side of the title of each law article once selected, in order to display the users connected to the same study system, who have commented or remarked on the same law article: by means of said function, it is possible to ask the system if a given law text has been commented on by someone and, in accordance with the privacy settings of said users, go to read the comments thereof, creating a sharing of professionalism and opinions;

a "finger" icon 114 for enabling/disabling the writing with the finger. Due to this function, the user can use the finger as a writing instrument in the margin of the text, without having to use the electronic pen 200;

a "create study folder" icon 115 in order to create study folders with various and personalized multimedia contents. In one version of the present invention, this icon is positioned in another screen depicting the virtual library thereof.

The touch-screen functions of said display 101 allow the arrangement of the text; in particular, the sliding of the text of each column downward or upward occurs following a vertical swiping movement performed by the user with a finger downward or upward; page change, forward or backward, occurs through a horizontal swiping movement respectively to the left or to the right performed by the user with a finger at the central portion 101.*a*; the sliding of the timeline 150 forward or backward over time occurs with a movement like that just described, applied on said top bar 101.*b*; the increase or the decrease of the range of the time grid on which the timeline 150 is depicted is caused with a movement, respectively widening or approaching, of two fingers of the user on the top bar 101.*b*; the same movement is used for enlarging the view of the law text in the central portion 101.*a*; to browse the text forward or backward by 7 pages (or another quantity predetermined by the user), instead, the user must perform a horizontal swiping movement respectively to the left or to the right with two fingers touching the central portion 101.*a* or with three fingers, causing the sliding of 50 pages at a time (or another quantity predetermined by the user). The interactions of the user with the electronic device 100 can also take place due to the electronic pen 200 with which such device is equipped. Such pen is power supplied by a common internal rechargeable battery, also directly rechargeable by connecting it to the device 100, and it is constituted by a tip 201 through which the user can underline the text or write within the blank spaces with extreme precision by simply touching said central portion 101.*a* of said display 101. It is important to indicate that there is no need to make any pre-selection in order to pass from the finger sliding mode to the writing mode with electronic pen 200, since the device is capable of distinguishing the tip 201 of said electronic pen 200 from the actions carried out by a finger.

Said electronic pen 200 represented in FIG. 1 is provided with the following buttons:

"mode" button 203, constituted by a common sliding button with three positions in order to reversibly change the writing mode on said display 101, in particular, due to the movement of the "mode" button 203, the user can go from a "pen" mode to a "highlighter" mode to an "eraser" mode;

"writing" button 206, constituted by a common button adapted to allow the modification of the space available for the writing and also adapted to enable or disable the view of the remarks; by means of said "writing" button 206, it also may be possible to change color and/or thickness of the mark left by the writing on the display 101. This allows an action of personalization by the user of the space of the code of regulation dedicated to his/her own remarks. With a double press of the same "writing" button 206 (double click), the user can enable the view of the remarks written with the electronic pen 200, or disable such view, with consequent reduction of the obtained additional space. In order to change the color or thickness of the writing or the thickness of cancelation, moreover, the user can simply keep the same "writing" button 206 pressed, thus causing the opening of a menu through which it is possible to modify the settings of the tool which is in use at that moment (pen, highlighter or eraser), changing the writing color and thickness or cancelation thickness as desired;

"timeline" button 204, in order to select on the timeline 150, present in the top bar 101.*b*, the effective historical periods of a rule to be compared and to enable or disable the view of the secondary timelines 150" on each law article. Said "timeline" button 204, which can be pressed in order to enable the comparison by which it is possible to select the effective periods of the regulation that one wishes to compare regarding the variations thereof over time, which will appear in flanking columns positioned in chronological order, possibly highlighting with suitable characters (e.g. different colors) the differences between one effective period and another. With a double press of the "timeline" button 204, moreover, it is possible to enable or disable the view of the secondary timelines 150" on each law article. The prolonged pressing of said "timeline" button 204, moreover, causes the opening of the options menu of the timeline 150 in which it is possible to set, for all the preselected regulatory texts or as default setting, the time width of the interval of the timeline 150 visible on said upper part 101.*b* of the display;

"social media" button 205: in order to view the users who use the same present system and who have commented on the article or on the legislative text under examination; by means of said "social media" button 205, moreover, it is also possible to reversibly show or hide the comments of the other users on each law article. More in detail, the pressing of said "social media" button 205 causes the opening of a list which indicates the users who use the system, object of the present invention, and who have commented on the law text or the article under examination at that moment; if selected, such comments can be viewed and enrich, in personalized manner, the personal code of regulation of the user. With a double press of the "social media" button 205, it is possible to enable or disable the view of all the comments.

The user can also write his/her own texts within the system with a word editor, alternating as desired remarks written with said electronic pen 200 and keyboard, and link the single paragraphs to law articles and to an effective historical period of such regulations, thus allowing the system to return information regarding the obsolescence or non-obsolescence of such documents based on the correspondence of such links with a law version no longer in force or still in force. Such information is useful both for the author (for a possible action of amending the obsolete text) and for possible third-party users who would like to know if various parts of the document are obsolescent before approaching them. The system, indeed, is adapted to serve warnings and notifications of various type, in order to signal to the user who wishes to view a study document thereof or of other users, each time the regulation to which he/she was initially linked by the author of the insertion has undergone one or more variations, that that document or parts thereof is obsolete.

In one version of the present invention, in addition, on said central portion 101.a of said display 101, it is possible to select a view and management option for all the multimedia folders created by the user and selected by means of said electronic pen 200 or by means of a simple press with a finger.

Finally, it is clear that modifications, additions or variations that are obvious for a man skilled in the art can be made to the invention described up to now, without departing from the protective scope which is provided by the enclosed claims.

The invention claimed is:

1. An electronic system for amending and studying codes of regulation, provided with an electronic device (100), consisting of a common electronic reader, preferably provided with an "eInk" technology, or a common tablet, provided with a common power on/power off button (106) and a battery power system provided with a power supply port (107) adapted to allow said battery to be connected to an electrical power grid by a common battery-charging transformer; said electronic device (100) being provided with common Internet connection means (400), adapted to allow receiving data regarding the regulatory texts and amendments to said regulatory texts from a dedicated server (300); said server (300) being connected to a database (324) adapted to store in its memory data relating to at least said regulatory texts and modifications thereof over time and being adapted to automatically download the amendments to said regulatory texts, based on the data loaded into said database (324) when accessing, by means of said electronic device (100), the Internet (400); said electronic device (100) being provided with a display (101) having touch-screen technology; said display (101) consisting of at least four portions:

a central portion (101.a) adapted to allow the view of the preselected regulatory text, preferably within a dual-column layout, if oriented vertically, and a dual-page and dual-column layout, if oriented horizontally;

a top bar (101.b) adapted to allow the view of a timeline (150) wherein the dates when modifications to the displayed regulatory text or part thereof were stored are highlighted;

a side bar, preferably of the pop-up type, with a pop-up interactive index (101.d), adapted to allow the view of the list of rules and law articles present in the regulatory text under examination;

a bottom bar (101.c) adapted to allow the view of a plurality of function icons, such as at least:

a "view" icon (105) for viewing the regulatory text, consisting of at least a first switch (105') adapted, under the user's control, to reversibly enable and disable the view of highlights and notes written by the user in the margin of the regulatory text, a second switch (105") adapted, under the user's control, to reversibly enable and disable the view of notes written by said user in the margin of the displayed regulatory text, and a third switch (105''') adapted, under the user's control, to reversibly enable and disable the view of a plurality of secondary timelines (150"), consisting of graphical representations relating to a single article of a given regulatory text, said secondary timelines (150") being adapted to highlight the dates when modifications to the article to which they refer were stored;

a "comparison" icon (109), adapted, under the user's control, to determine the simultaneous view of the same preselected rule in a plurality of variations, laid out in a left-to-right chronological order, each in a dedicated column of said central portion (101.a) of said display (101), said "comparison" view being characterized in that the portions of text that have been varied from one version to the other of the same rule are highlighted in the various regulatory texts;

a "full screen" icon (110), adapted, under the user's control, to reversibly set the view of the preselected regulatory text to a full-screen mode;

a print icon (111), adapted to send to a common printer connected to said electronic device (100) by means of a common wireless connection system, preferably of the Bluetooth type, the command to print the regulatory text displayed in said central portion (101.a) of said display (101);

a "manage bookmarks" icon (112), adapted to reversibly enter, modify, view or hide a plurality of bookmarks, consisting of reference points within the regulatory text, adapted to make it easier to search for contents of interest within the regulatory text itself;

a "social media" icon (113), adapted to allow the view of a list of users using said system, who have commented or written notes and remarks on the displayed regulatory text;

a "finger" icon (114), adapted to reversibly enable the capability of writing notes relating to the displayed regulatory text by the user's finger contacting said display (101);

a "create study folder" icon (115), adapted, under the user's control, to create study folders with custom multimedia contents;

said display (101) being provided with touch-screen technology and being adapted to allow the columns of the displayed text to slide downward or upward by an upward or downward vertical swiping movement performed by the user with a finger on said central portion (101.a), said touch-screen technology of said display (101) being adapted to allow all the displayed columns to slide simultaneously by swiping the user's finger upward or downward on any one of the displayed columns; said display (101) being further adapted to allow changing page, forward or backward, through a horizontal swiping movement to the left or to the right, respectively, performed by the user with a finger on said central portion (101.a), in particular in order to browse, forward or backward, through the text by a first predetermined number of pages, preferably seven pages, the user has to perform a horizontal swiping movement to the left or to the right, respectively, with two fingers touching said central portion (101.a) of said display (101), whereas to browse, forward or backward, through the text by a second predetermined number of pages, preferably fifty pages, the user has to perform a horizontal swiping movement to the left or to the right, respectively, with three fingers touching the central portion (101.a) of said display (101); said touch-screen display (101) being further adapted to allow sliding the timeline (150) forward or backward over time by a horizontal swiping movement to the left or to the right, respectively, performed by the user touching with one finger said top bar (101.b), said touch-screen display (101) being adapted to allow increasing or decreasing the size of the displayed text, by a widening or approaching movement, respectively, performed by the user with two fingers on said central portion (101.a); said timeline (150) being adapted to graphically represent, by predetermined colors and/or symbols, the effective periods of a rule between one variation date and the other, said predetermined colors and/or symbols being further adapted to notify the user about the successful reading of the text, with or without remarks, or failure to read the text, in that specific version of the rule; said timeline (150) being further adapted to allow the user to quickly go from one version of the rule to the other over time, by simply selecting the corresponding reference graphical-time interval; said electronic system for amending and studying codes of regulation further comprising at least one electronic pen (200), provided with a common rechargeable battery, adapted to allow the user to complement and underline the text with highlights, remarks, notes, external links, images and other multimedia contents useful for studying and analyzing the text; said electronic pen (200) being characterized by a tip (201) adapted to allow the user to write on said display (101) in a precise manner; said electronic pen (200) being provided with at least:

- a "mode" button (203), provided with three positions and adapted to be used by the user to determine the reversible switching from a "highlighter" mode, characterized in that by passing said tip (201) over the text of interest, it will be provided with a colored background, to a "pen" mode wherein the user may write down remarks within the blank spaces of the displayed text, to an "eraser" mode characterized in that by passing said tip (201) over already written notes or remarks or over text portions already highlighted by the user, said notes or highlights are erased;
- a "timeline" button (204), adapted to be pressed by the user to enable a view mode adapted to compare a plurality of versions of a regulatory article of interest by selecting on said timeline (150) the effective periods of interest; following said selection, the texts of interest will be displayed in said central portion (101.a) of said display (101) within a layout consisting of a plurality of flanking columns, positioned in a chronological order, each of said columns corresponding to an effective period selected in said timeline (150); said "timeline" button (204) of said electronic pen (200) being adapted, by a double press, to reversibly enable or disable the view of a plurality of secondary timelines (150"), consisting of graphical representations adapted to highlight the effective period and any dates of variations made to a specific law article to which these refer; said "timeline" button (204) of said electronic pen (200) being adapted, by prolonged pressing, to cause a menu to open which is adapted to allow modifying the view options for said timeline (150) on said top bar (101.b) of said display (101);
- a "writing" button (206), adapted to be pressed to cause a menu to open by which it is possible to modify the color and thickness settings of the tool which is enabled at the time at the "mode" button (203), that is the highlighter color, the pen writing color or thickness, or the thickness of the "eraser" tool; said "writing" button (206) being further adapted to be pressed to determine the modification of the size of the space available for the user to write down notes; said "writing" button (206) being further adapted, by a double press, to determine the reversible view of highlights and/or notes written by the user in the margin of the displayed regulatory text;

said electronic pen (200) being adapted to write in a predefined area around each law article so that, by approaching the margin of such area with writing, the system automatically opens an additional space of modifiable size to allow the user to have customizable space for remarks relating to that law article.

2. An electronic system for amending and studying codes of regulation, according to claim 1, wherein, due to said Internet connection means (400), said database (324) is adapted to store the highlights, comments and notes relating to each regulatory article written by each user using said system; said system being adapted to notify each user about the presence of new regulation amendments, with reference to the regulatory articles of interest, downloadable from said database (324) to make them available for reading on their electronic device (100).

3. An electronic system for amending and studying codes of regulation, according to claim 1, wherein said electronic pen (200) is provided with a "social media" button (205) consisting of a common button adapted to be pressed by the user to determine the opening of a list of users, using said system, who have commented on the article under examination, said list being characterized in that, by selecting the name of at least one user, it is possible to view the comments and/or remarks by said user directly on the regulatory text to which they refer; said "social media" button (205) being further adapted to allow reversibly viewing or hiding said comments and/or remarks entered by the users selected from said list by a double press on the same "social media" button (205).

4. An electronic system for amending and studying codes of regulation, according to claim 1, wherein next to each law article present in said central portion (101.a) of said display (101), there is an "article social media" button (113') adapted to display a list of users using said system who have commented or written notes and remarks on the selected law article.

5. An electronic system for amending and studying codes of regulation, according to claim 1, wherein by a prolonged pressing of said "timeline" button (204) of said electronic pen (200), the user determines the view of a menu adapted to allow the modification of the settings of said timeline (150), in particular it is possible to set, for all of the regulatory texts or only for a number of preselected regulatory texts, the time interval relevant to said timeline (150) visible on said top bar (101.b) of said display (101).

6. An electronic system for amending and studying codes of regulation, according to claim 1, wherein it is adapted to report any obsolescence of the regulatory text and comments or notes thereon, by means of any notification icon.

7. An electronic system for amending and studying codes of regulation, according to claim 1, wherein within said central portion (101.a) of said display (101), it is possible to select an option for viewing and managing all the folders or multimedia "study folders" created by the user and selectable by means of said electronic pen (200) or by a simple press with a finger.

8. An electronic system for amending and studying codes of regulation, according to claim 1, wherein, by means of the settings of each "study folder", the user can link the single contents of each "study folder" to one or more law articles and to an effective time period of such regulations thus allowing the system, whenever the reference law articles are amended, to notify the user about any regulatory obsolescence of such materials.

9. An electronic system for amending and studying codes of regulation, according to claim 2, wherein said electronic pen (200) is provided with a "social media" button (205) consisting of a common button adapted to be pressed by the user to determine the opening of a list of users, using said system, who have commented on the article under examination, said list being characterized in that, by selecting the name of at least one user, it is possible to view the comments and/or remarks by said user directly on the regulatory text to which they refer; said "social media" button (205) being further adapted to allow reversibly viewing or hiding said comments and/or remarks entered by the users selected from said list by a double press on the same "social media" button (205).

10. An electronic system for amending and studying codes of regulation, according to claim 2, wherein next to each law article present in said central portion (101.*a*) of said display (101), there is an "article social media" button (113') adapted to display a list of users using said system who have commented or written notes and remarks on the selected law article.

11. An electronic system for amending and studying codes of regulation, according to claim 3, wherein next to each law article present in said central portion (101.*a*) of said display (101), there is an "article social media" button (113') adapted to display a list of users using said system who have commented or written notes and remarks on the selected law article.

12. An electronic system for amending and studying codes of regulation, according to claim 2, wherein by a prolonged pressing of said "timeline" button (204) of said electronic pen (200), the user determines the view of a menu adapted to allow the modification of the settings of said timeline (150), in particular it is possible to set, for all of the regulatory texts or only for a number of preselected regulatory texts, the time interval relevant to said timeline (150) visible on said top bar (101.*b*) of said display (101).

13. An electronic system for amending and studying codes of regulation, according to claim 3, wherein by a prolonged pressing of said "timeline" button (204) of said electronic pen (200), the user determines the view of a menu adapted to allow the modification of the settings of said timeline (150), in particular it is possible to set, for all of the regulatory texts or only for a number of preselected regulatory texts, the time interval relevant to said timeline (150) visible on said top bar (101.*b*) of said display (101).

14. An electronic system for amending and studying codes of regulation, according to claim 4, wherein by a prolonged pressing of said "timeline" button (204) of said electronic pen (200), the user determines the view of a menu adapted to allow the modification of the settings of said timeline (150), in particular it is possible to set, for all of the regulatory texts or only for a number of preselected regulatory texts, the time interval relevant to said timeline (150) visible on said top bar (101.*b*) of said display (101).

15. An electronic system for amending and studying codes of regulation, according to claim 2, wherein it is adapted to report any obsolescence of the regulatory text and comments or notes thereon, by means of any notification icon.

16. An electronic system for amending and studying codes of regulation, according to claim 3, wherein it is adapted to report any obsolescence of the regulatory text and comments or notes thereon, by means of any notification icon.

17. An electronic system for amending and studying codes of regulation, according to claim 4, wherein it is adapted to report any obsolescence of the regulatory text and comments or notes thereon, by means of any notification icon.

18. An electronic system for amending and studying codes of regulation, according to claim 5, wherein it is adapted to report any obsolescence of the regulatory text and comments or notes thereon, by means of any notification icon.

19. An electronic system for amending and studying codes of regulation, according to claim 2, wherein within said central portion (101.*a*) of said display (101), it is possible to select an option for viewing and managing all the folders or multimedia "study folders" created by the user and selectable by means of said electronic pen (200) or by a simple press with a finger.

20. An electronic system for amending and studying codes of regulation, according to claim 3, wherein within said central portion (101.*a*) of said display (101), it is possible to select an option for viewing and managing all the folders or multimedia "study folders" created by the user and selectable by means of said electronic pen (200) or by a simple press with a finger.

\* \* \* \* \*